May 5, 1931. A. T. SPONAR 1,804,123
GAS WATER HEATER
Filed June 18, 1928 4 Sheets-Sheet 2
FIG. II.
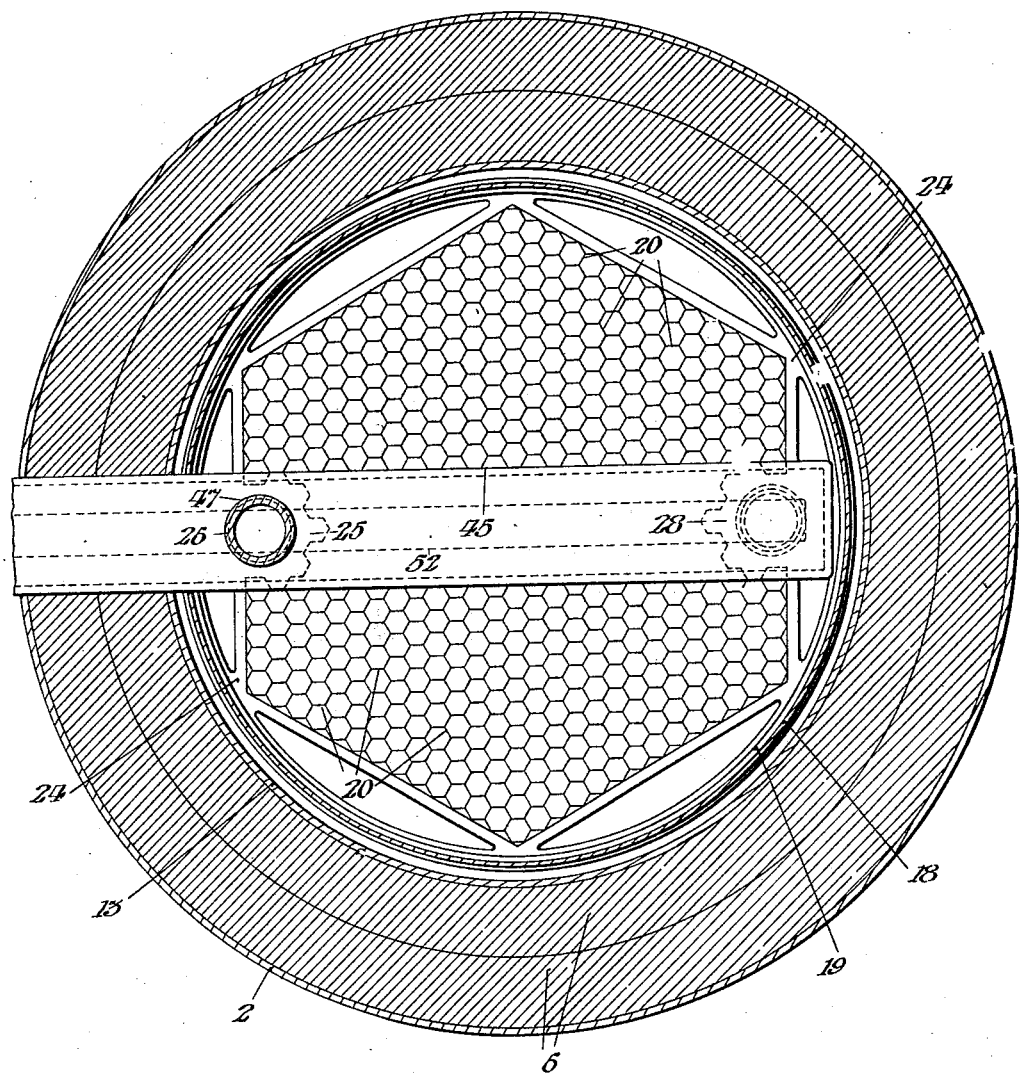
INVENTOR:
ALOYSIUS T. SPONAR, May 5, 1931. A. T. SPONAR 1,804,123
GAS WATER HEATER
Filed June 18, 1928 4 Sheets-Sheet 3
FIG. III.
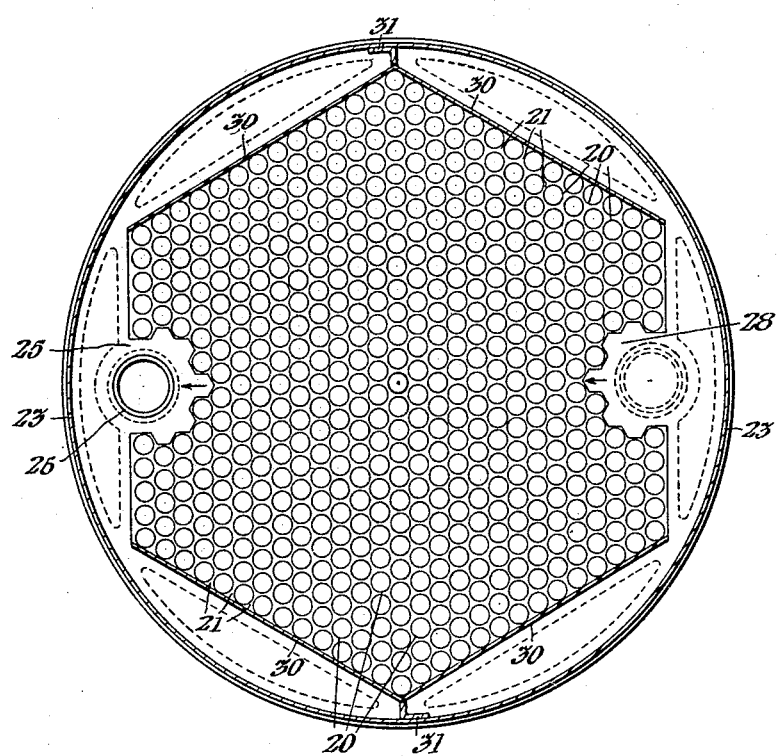
INVENTOR:
ALOYSIUS T. SPONAR,

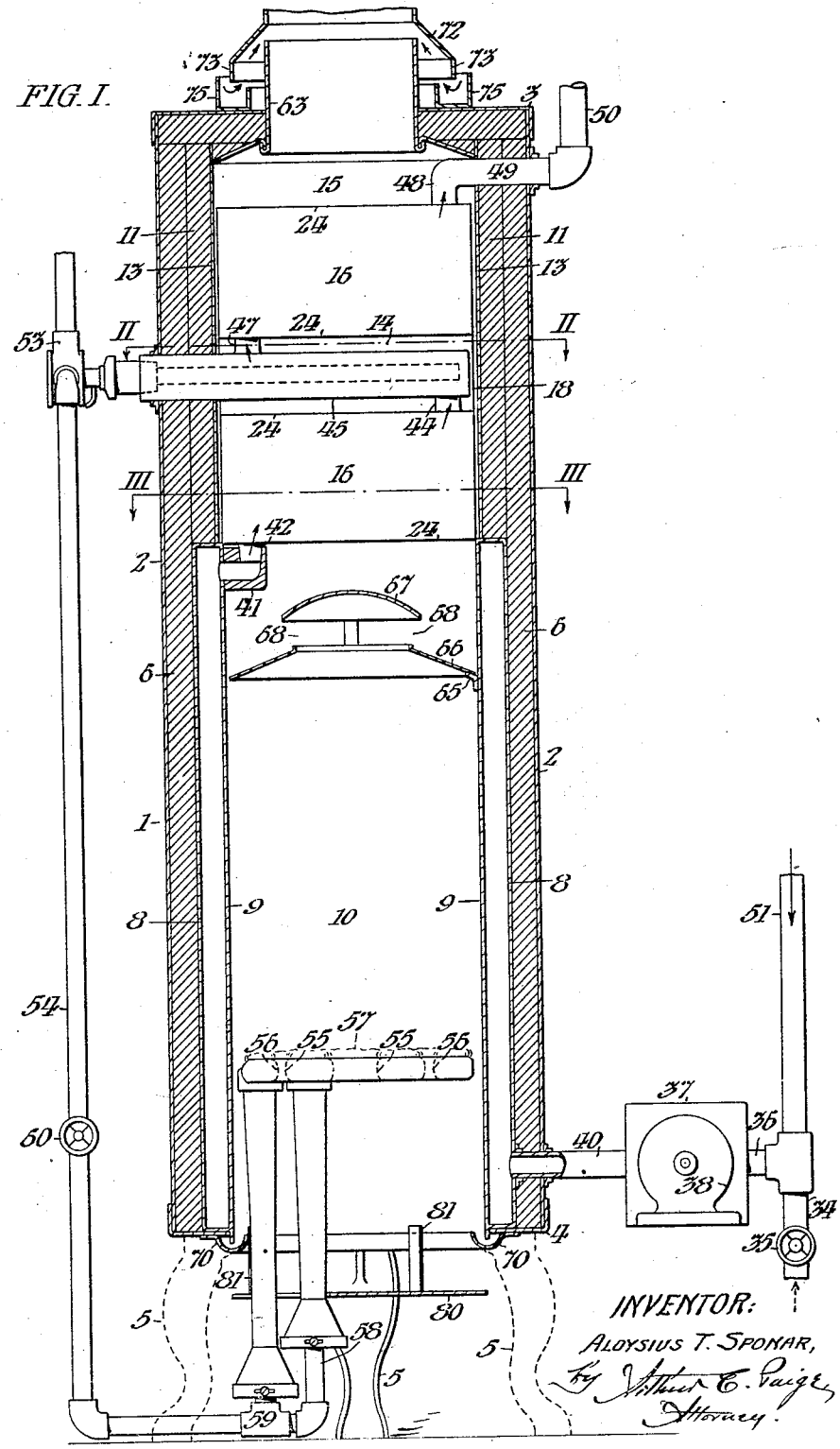

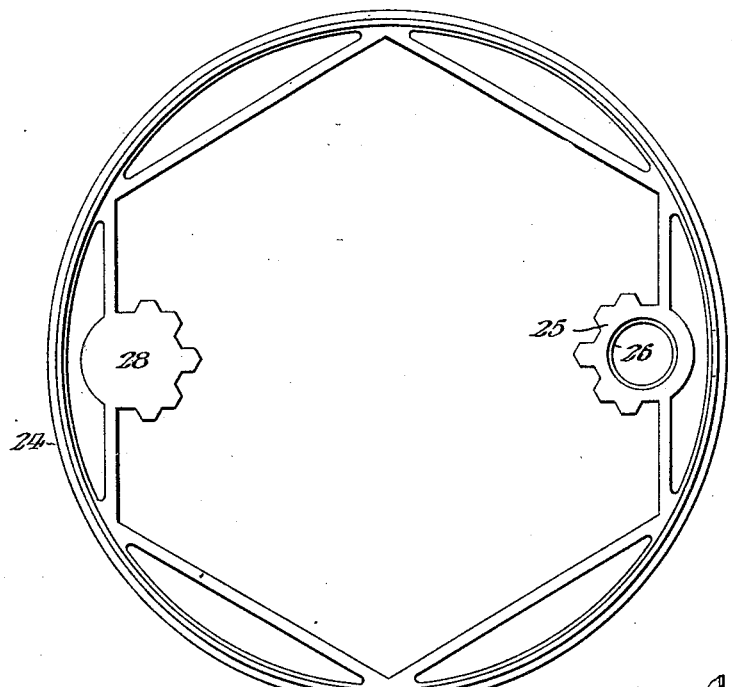
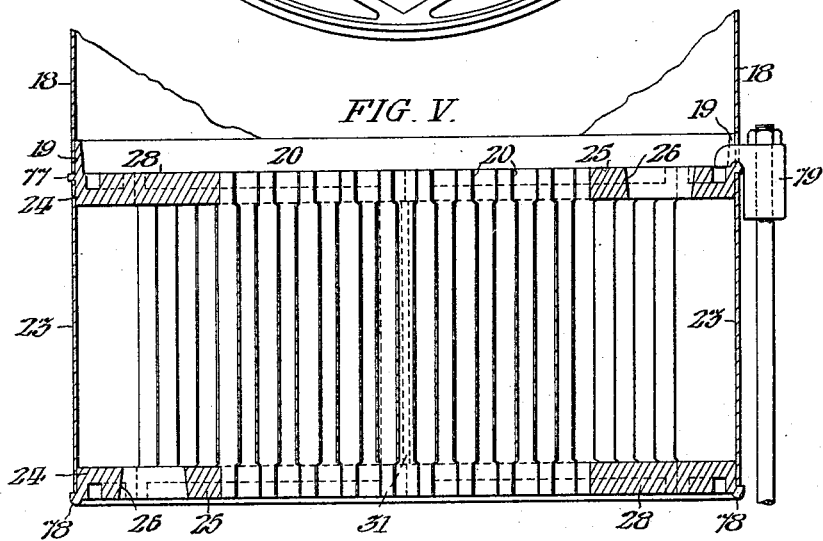

Patented May 5, 1931

1,804,123

UNITED STATES PATENT OFFICE

ALOYSIUS T. SPONAR, OF CONSHOHOCKEN, PENNSYLVANIA, ASSIGNOR TO JOHN WOOD MANUFACTURING COMPANY, OF CONSHOHOCKEN, PENNSYLVANIA, A CORPORATION OF PENNSYLVANIA

GAS WATER HEATER

Application filed June 18, 1928. Serial No. 286,373.

My invention relates to heaters adapted for use in house heating systems and including, in cooperative relation with a gas burner, a water container of what is known as "honeycomb" or similar cellular construction, and preferably includes means for maintaining a forced circulation of water within the heating system, conveniently by an electrically operative pump; the operation of the device being controlled by thermostatically operative means.

My improvement relates particularly to the construction and arrangement of cellular units of such a water container; whereby the proper assemblage of a series of such units may be effected and maintained and the maximum heating efficiency of each unit assured.

Although the heater chosen for illustration herein, somewhat resembles the heater shown in my copending application Serial Number 218,013 filed September 7, 1927, for Letters Patent of the United States; it differs therefrom in that the construction and arrangement of the present invention are such as to utilize, to contain water, the space which is occupied by baffle plates in said copending application structure and with a thermal efficiency approximately 40% greater. Moreover in said copending application, each cellular unit section has a water inlet and water outlet opening through the circumference thereof, whereas, my present invention provides means for forming such openings parallel with the axis of each section and within the perimeter of the section.

Moreover, the form of my invention hereinafter described includes means for preventing precipitation of moisture from the products of combustion upon the gas burner. Such moisture, which is normally condensed and returned to the combustion chamber by contact with the primarily cold surfaces of the flue tubes in the water container sections for a time after the heater is started into operation; has a tendency to drip back upon the burner and to extinguish the flames thereat, therefore, I provide means for deflecting the precipitated condensate aside from the burner and to temporarily store the same below the latter, until the rising temperature in the heater, incident to its continued operation, causes such condensate to be revaporized and discharged through the heater flues, without condensation therein.

My invention includes the various novel features of construction and arrangement hereinafter more definitely specified.

In said drawings; Fig. I is a vertical sectional view of a heater conveniently embodying my invention.

Fig. II is a plan sectional view taken on the line II—II in Fig. I.

Fig. III is a transverse sectional view of one of the cellular unit heater sections taken on the line III—III in Fig. I.

Fig. IV is a plan view of one of the cellular unit section closure rings indicated in Figs. I and II.

Fig. V is a diametrical sectional view of said ring shown in Fig. IV.

In said figures; the heater 1 comprises the outer cylindrical shell 2 having the circular head 3 and bottom plate 4; the latter provided with three legs 5, preferably detachably connected therewith. Said shell 2 is provided with the insulating lining 6, extending from the bottom to the top thereof and surrounding the water jacket comprising the outer shell 8 and inner shell 9; which latter incloses the combustion chamber 10. Above said water jacket, said shell 2 is provided with a second inner cylindrical insulating lining 11 supported by said water jacket beneath it and the inner cylindrical shell 13, within said lining 11. Said inner shell 13 incloses the flue chambers 14 and 15, containing the two cellular heater units 16, which may be precisely alike, but disposed in opposite relation, as indicated in Fig. I.

Said cellular heater units 16 are conveniently held in the axially spaced relation indicated in Fig. I, by the circular coupling band 18, which is push fitted over the flanges 19 on said units, and may be constricted thereon; so that said units may be assembled in proper axially spaced relation before they are placed in said shell 13.

Each of said heater units 16 includes a hexagonal congeries of thin copper tubes 20 which are primarily cylindrical but which are enlarged to hexagonal form at their opposite ends where they are soldered together so as to afford passages thru them for products of combustion. The intermediate cylindrical portions of said tubes 20 being in spaced relation, afford water spaces 21 surrounding them inclosed by the cylindrical shell 23 which is soldered to the opposite end closure frames 24. Said frames 24 are alike in that each has a circular perimeter fitted in said shell 23, an internal hexagonal opening fitted to said congeries 20, a port flange 25 surrounding a port 26, and a filler flange 28 diametrically opposite to said port flange 25 and of the same configuration, so as to accurately fit the irregular openings formed in said congeries by the omission of groups of said tubes 20 to receive said flanges 25 and 28; but the band flanges 19 are only on the intermediate frames. However, as indicated in Fig. I, said frames 24 are disposed in diametrically opposite relation so that the port flange 25 in the bottom of the unit comes opposite to the filler flange in the top of the unit, and vice versa. In order to attain the maximum efficiency thereof; each of said cellular heater units 16 also includes baffle means compelling the water admitted thru one port 26 to traverse the narrow inner spaces 21 between said tubes 20, to the other port, instead of flowing between said ports 26 thru the wider outer spaces between the hexagonal congeries and the outer cylindrical shell 23. As shown in Figs. III and V; such means includes the opposite vertical partitions 30 which are formed of sheet metal extending from bottom to top of the congeries of tubes 20 and angularly bent to fit the opposite sides thereof; and diametrically opposite vertical baffle plates 31 between said cylindrical shell 23 and said partition plates 30, intermediate of the extent of the latter.

Referring to Fig. I; water is primarily supplied to said heater thru the pipe 34 under control of the valve 35, which is normally closed. Said pipe 34 has a branch pipe 36 leading to the pump 37 which is conveniently operated by the electric motor 38 so as to deliver the water under pressure thru the pipe 40 into the water jacket 8, 9 aforesaid. Said jacket has the water outlet fitting 41 at the upper end thereof opposite to said pipe 40 and adapted to be connected with the port 26 in the lower cellular unit 16, by a push fitting nipple 42. The water thus admitted to said lower unit 16, passes thence thru the port in the upper frame 24 by way of the branch 44 of the thermostat fitting 45 which extends diametrically in the heater and has the other branch 47 adapted to push fit the lower port 26 in the upper cellular unit 16. The water thus admitted to the upper unit 16 escapes therefrom thru the port 26 in the upper frame 24 by way of the push fitting 48 having the branch 49 extending thru the side of said heater shell 2, in communication with the pipe 50 leading to the radiators or other hot water utilizing devices which the said heater is intended to supply and from which the water is returned by way of the pipe 51 which connects with said pipe 36 on the intake side of the pump 37.

Said thermostat fitting 45 extends thru the outer shell of the heater and incloses the thermostatic element 52, which is thus subjected to the temperature of the water between the two cellular units 16. Said thermostatic element 52 is connected with the valve casing 53 containing a thermostatically operative valve controlling the supply of gas thru the pipe 54 to the burners 55 and 56; so that when the water in the fitting 45 reaches a predetermined temperature, the supply of gas to the burners 55 and 56 is reduced to a predetermined minimum barely sufficient to maintain the flames 57 thereat, but, whenever the temperature of the water in said fitting 14 falls below such predetermined temperature, the valve in said casing 53 is opened, more or less, in accordance with the temperature of said water, to increase the flow of gas to said burners 55 and 56, until the water is restored to the predetermined temperature. Said burners 55 and 56 are preferably connected with said gas supply pipe 54 through respective branches 58 and 59, but may both be controlled by one manually operative valve 60. The construction and arrangement are such that the thermostatically operative valve in the casing 53 determines the minimum flow of gas supplied to said burners, whereas, the manually operative valve 60 may be set to determine the maximum flow of gas supplied to said burners, of course, subject to the control of the automatically operative valve in said casing 53.

When said burners 55 and 56 begin to operate with the water in the cellular units 16 cold; considerable moisture is condensed from the products of combustion and, unless means be provided to prevent it, may be precipitated upon the burners and extinguish some or all of the flames thereat with consequent loss of efficiency and escape of unconsumed gas thru the flue pipe 63, which should be connected to a chimney vent. To prevent such precipitation upon the burners, I mount upon three lugs 65 in the combustion chamber 10 a baffle device comprising the annular shield 66 and the central disk 67, which are conveniently secured in rigid relation. Altho the products of combustion escape upwardly freely thru the passageways 68 between said baffle members 66 and 67; the water condensed from the products of combustion by contact with the cold tubes 20 in the cellular unit 16, drips upon said baffle device and is shed against the inner surface of the shell 9 which, unless it is warm enough to revaporize such condensate, permits the latter to drip into the annular pan 70 which is conveniently removably supported at the bottom of the heater. Said pan is of sufficient capacity to hold the maximum quantity of water which may be thus precipitated into it; such condensate being subsequently revaporized when the heater becomes hot during its subsequent operation; so that such condensate is ultimately carried off with the products of combustion thru the flue pipe 63. Moreover, I prefer to provide said flue pipe 63 with the Venturi hood 72 having the drip flange 73 overhanging the annular pan 75 to deposit in the latter condensate from said hood and its connections; to be revaporized and dissipated as aforesaid.

Altho I prefer to form the circumference of each of the end closures 24 so that it fits within a cylindrical shell and has a circumferential flange 77 overhanging the edge of such shell, to facilitate the sealing of the joint between said elements by merely dipping the assembled structure in molten solder or other suitable alloy; the cost of construction may be somewhat lessened by omitting said flange and allowing the outer shell to extend flush with the outer faces of the opposite end closures 24. Moreover, I prefer to provide the outer faces of said end closures 24 with projections 78, which may be circumferential beads, for engagement with clamping means 79; whereby said units may be pushed and held together, without such clamping means 79 slipping off said faces of said closures. However, such projections are not essential to the operation of said units, as herein contemplated, and may be omitted.

I find it advantageous to employ a plurality of burners which are separately supplied with gas, as above contemplated to insure thoro mixture of the gas with the atmospheric air for each burner. It is not as satisfactory to employ a single burner of the large capacity required for such a heater as above described with a single gas inlet thereto; for the reason that after a predetermined temperature of the water in the thermostatic casing 45 is reached; say, 170° F.; the volume and consequent pressure of the gas supplied to the heater is reduced, by the automatic operation of the thermostatic valve in the casing 53, to such an extent that the force with which it is injected into the burner is not sufficient to effect the most efficient mixture thereof with the volume of atmospheric air required for complete combustion. The influx of secondary air may be varied by axial adjustment of the bottom closure disk 80, which has spring fingers 81 frictionally engaging the inner edge of said pan 70; and may blow out without damage if there is an explosion in the combustion chamber.

Altho I have referred to the units aforesaid as water heater units; it is obvious that steam may be generated therein for dispensation thru said pipe 49, or otherwise.

Therefore, I do not desire to limit myself to the precise details of construction and arrangement herein set forth, as it is obvious that various modifications may be made therein without departing from the essential features of my invention, as defined in the appended claims.

I claim:
1. A cellular water heater unit, comprising a congeries of tubes having their opposite ends expanded and connected together; a cylindrical casing encircling said congeries and inclosing a water space around said tubes, and in communication with the spaces between said tubes; similar end closures for the water space in said unit, each being an annular metallic frame having a substantially circular perimeter and a polygonal opening fitted to said congeries, and having upon respectively diametrically opposite sides thereof, an inwardly extending port flange, surrounding a water port, and an inwardly extending filler flange; said port flanges and filler flanges having such configuration as to fill spaces in said congeries formed by omission of groups of tubes thereat; said closure frames being disposed in opposite relation, so that the port flanges at each end of the unit are respectively opposite to the filler flanges at the opposite ends of the unit.

2. A structure as in claim 1; wherein the tubes have their opposite ends expanded to polygonal form and the port flanges and filler flanges are of corresponding polygonal configuration at their perimeters.

3. A structure as in claim 1; wherein the water is compelled to traverse the spaces between the tubes, by baffle elements including vertical partitions at opposite sides of said congeries and connected with opposite sides of said outer casing, between said ports.

4. The combination with two heater units as described in claim 1; of means adapted to hold said units in axially spaced relation, and means connecting the adjacent ports of said units, including a thermostatic fitting extending transversely to the axis of said units and having branches respectively in communication with said ports.

5. An end closure for the water space in a cellular water heater unit, comprising an annular metallic frame having a substantially circular perimeter, and a polygonal axial opening, and having upon respectively diametrically opposite sides of said opening, an inwardly extending port flange surrounding a water port, and an inwardly extending filler flange.

6. A structure as in claim 5; wherein the port flanges and filler flanges have such configuration as to fill spaces in a congeries of tubes included in the heater unit, which spaces are formed by omission of groups of tubes at said flanges.

7. A structure as in claim 5; wherein the perimeter of said closure is adapted to fit in a cylindrical shell, and includes a circumferential flange adapted to extend outwardly over the end of said shell.

8. A structure as in claim 5; having a projection at the axially outward face thereof adapted for engagement with clamping means.

9. The combination with two cellular water heater units each including a congeries of tubes having their opposite ends expanded and connected together and a cylindrical casing encircling said congeries and inclosing a water space around said tubes; of water ports in said units, at diametrically opposite portions thereof, but within the outer circumference thereof; and means connecting the ports in the adjacent faces of said units, including a fitting extending transversely with respect to the common axis of said units and having branches respectively fitted to said ports; wherein the cellular water heater units are held in axially spaced relation by means independent of the fitting connecting their adjacent ports, and including a circumferential band encircling said units and having means whereby it may be constricted thereon.

10. A cellular heater unit having opposite end closures each comprising an annular metallic frame; an annular casing connecting said end closures at the perimeters thereof; one of said closures having a circumferentially extending flange projecting axially beyond the edge of said casing and adapted to engage a coupling band, for assembling two such units in axial relation by engagement with their similar flanges.

11. A gas water heater having an annular condensate pan at the bottom thereof, and an axially adjustable closure for the central opening in said pan, comprising a disk having spring fingers engaging said pan; whereby the admission of secondary air to said heater may be controlled, and said closure forms a safety blow-out valve for exploded gases.

In testimony whereof, I have hereunto signed my name at Conshohocken, Pennsylvania, this twenty-eighth day of May, 1928.

ALOYSIUS T. SPONAR.